US005452502A

United States Patent [19]
Walter et al.

[11] Patent Number: 5,452,502
[45] Date of Patent: Sep. 26, 1995

[54] TURRET-TYPE MACHINE TOOL

[75] Inventors: Heinz Walter, Renningen; Wolfgang Grau, Böblingen; Helmut Heselschwerdt, Magstadt, all of Germany

[73] Assignee: Witzig & Frank Turmatic GmbH, Offenburg, Germany

[21] Appl. No.: 182,595

[22] Filed: Jan. 18, 1994

[30] Foreign Application Priority Data

Jan. 20, 1993 [DE] Germany .................. 43 01 393.7

[51] Int. Cl.⁶ .................................................. B23Q 7/02
[52] U.S. Cl. ..................... 29/38 B; 29/38 A; 82/129
[58] Field of Search ................... 29/38 B, 38 C, 29/38 A, 564, 563, 33 P, 36; 82/129

[56] References Cited

U.S. PATENT DOCUMENTS

| | | | |
|---|---|---|---|
| 1,671,354 | 5/1928 | De Leeuw | 29/38 A |
| 1,805,054 | 5/1931 | Spring | 29/38 A |
| 2,181,873 | 12/1939 | Cregar | 408/4 |
| 3,552,240 | 1/1971 | Wüsteney | 29/38 C |
| 4,473,930 | 10/1984 | Bezner et al. | 29/38 C |
| 4,520,595 | 6/1985 | Diener | 29/38 C |
| 4,655,652 | 4/1987 | Schissler | 29/563 |
| 5,261,748 | 11/1993 | Ettori | 29/38 B |

FOREIGN PATENT DOCUMENTS

| | | | |
|---|---|---|---|
| 0043584 | 1/1982 | European Pat. Off. | |
| 0407794 | 1/1991 | European Pat. Off. | |
| 1454406 | 10/1966 | France | |
| 2190578 | 2/1974 | France | |
| 1027959 | 4/1958 | Germany | |
| 2332173 | 1/1974 | Germany | |
| 2755755 | 6/1979 | Germany | |
| 2804584 | 8/1979 | Germany | 29/38 C |
| 0152743 | 12/1981 | Germany | |
| 3941480 | 6/1991 | Germany | |
| 1456297 | 2/1989 | U.S.S.R. | 29/38 A |

OTHER PUBLICATIONS

Patents Abstracts of Japan, vol. 3, No. 84 (M-66), Jul. 20, 1979 of JP A 54 059 680 (Toyoda Koki K.K.) 14 May 1979.

Soviet Patents Abstracts, Section PQ, Week 9107, 3 Apr. 1991, Derwent Publications Ltd., London, GB; Class P56, AN 91–049637 of SU,A,1 570 874 (Tekhnolog Prodn Mac) 15 Jun. 1990.

*Primary Examiner*—William Briggs
*Attorney, Agent, or Firm*—Frishauf, Holtz, Goodman, Langer & Chick

[57] ABSTRACT

A turret-type machine tool has a workpiece support that can be indexed incrementally by a step-drive and is locked to be stationary in angular positions corresponding to individual machining stations. In the individual machining stations, machining units are provided, each of them carrying a machining spindle. Workpiece holders are supported on the workpiece supports with planet axes located in at least one horizontal plane; the planet axes extend at a tangent to and radially spaced apart from the vertical switching axis of the workpiece support and are each aligned in pairs parallel to one another.

13 Claims, 13 Drawing Sheets

TURRET-TYPE MACHINE TOOL

FIELD OF THE INVENTION

The invention relates to a turret-type machine tool having a workpiece support, supported rotatably about a vertical tool switching axis and indexable incrementally by a step-drive, which support is locked to be stationary in individual machining stations in accordance with angular positions and on which workpiece holders or receptors, formed in the manner of circular tables, are rotatably supported, in each case about their own axis, the planet axis, which holders or receptors are rotatable about their own planet axis by switching or drive means, and having machining units assigned to the various machining stations that are located laterally of the workpiece support, each of which units has at least one machining spindle that can be positioned in the direction of the workpiece support.

BACKGROUND

From German Examined, Published Patent Application DE-AS 1 027 959 of Witzig et al, a turret-type machine tool with a workpiece support in the form of a circular switching table for a plurality of machining stations is known. The workpiece holders located on the circular switching table can be rotated automatically about their own axis during the onward indexing of the table in such a way that the workpieces are aligned parallel to one another in the various machining stations. Besides the circular switching table, machining units assigned to the various machining stations are provided, formed as multiple-spindle heads; their machining spindles, carrying various workpieces, can be positioned with respect to the workpiece support. The arrangement is such that in each machining station, with the tools inserted into the machining spindles of the multispindle head, various operations can be performed simultaneously for a number of identical workpieces corresponding to the number of machining spindles; these workpieces are clamped to workpiece holders that succeed one another over the circumference of the circular switching table. However, a machine of this kind can be used only to machine special workpieces, such as fittings, in which relatively simple machining operations are to be performed and that have the characteristic that they can be take care of in groups by the machining spindles of a multispindle head.

Another turret-type machine tool, known from U.S. Pat. No. 4,473,930, Bezner et al, assigned to the assignee of this application, to which German Patent 2 755 755 corresponds, is substantially more universally usable; in it, an incrementally indexable workpiece support, rotatably supported about a vertical axis, is suspended from the top wall part of a rigid and inherently stable and distortion-resistant closed cage, whose bottom wall part is formed like a tub and has a central chip removal opening. The workpiece holders are located on the circumference of the disklike workpiece support. Machining the workpieces clamped thereon is done by machining units that are located in the various machining stations and operate from the side, from above and from below. The workpiece holders are aligned with their axes precisely radially with respect to the workpiece support; that is, the axis intersect the vertical switching axis of the workpiece support. Without additional equipment, the machining spindles inserted into the side walls of the cage can machine the workpieces essentially only from the face end. Machining over the circumference is done by the machining units that work from above and below. In principle, however, the machining spindles of a machining station can machine only the workpiece located in that machining station; they cannot be simultaneously used to machine workpieces in adjacent machining stations as well. Aside from this fact, this turret-type machine tool can in principle, with a view to the housing size, be used only to machine workpieces whose dimensions do not exceed certain values.

THE INVENTION

It is an object to create a turret-type machine tool, which with great flexibility and short machining times per piece is distinguished in its usage capabilities by precise machining and moreover makes do with relatively few machining units.

Briefly, the workpiece holders are supported on the workpiece support with planet axes located in at least one horizontal plane; the planet axis extend at a tangent to and radially spaced apart from the vertical switching axis of the workpiece support, and are each aligned in pairs parallel to one another.

By way of example, the novel turret-type machine tool makes it possible to machine the workpiece, clamped to a workpiece holder, on five sides (four circumferential sides and one end) or on arbitrarily many sides, in the case of a round workpiece circumference, for instance, with horizontal machining units, without having to reclamp the workpiece or temporarily swivel it upward or downward into a different plane. This assures high machining precision, while at the same time great versatility of the machine for the most various, complicatedly designed workpieces is possible.

In a preferred embodiment, the machining units are horizontally adjustably supported on horizontal guideways that are aligned parallel or at right angles to the planet axis of the workpiece support located in one of the angular positions. It is especially advantageous if at least one guideway has a length that covers two successive workpiece holders circumferentially of the workpiece support, such that the machining unit with its machining spindle is adjustable selectively to cooperate with one or the other of the two workpiece holders. Regardless of the type of workpieces to be machined, the arrangement may also be such that two machining units are located next to one another along at least one of the guideways and independently of one another carry out their positioning and operating motions.

DRAWINGS

Exemplary embodiments of the subject of the invention are shown in the drawings. Shown are:

FIG. 1, a schematic plan view of the turret-type machine tool of the invention;

FIG. 2, a side view of the turret-type machine tool of FIG. 1;

FIGS. 3–7, plan views corresponding to FIG. 1, each in various expansion versions with a different number of machining units, showing the turret-type machine tool of FIG. 1;

FIG. 8, in a schematic plan view in section along the line XIII—XIII of FIG. 9, a turret-type machine tool according to the invention in a second modified embodiment;

FIG. 9, a schematic side view in section along the lines IX—IX of FIG. 8 of the turret-type machine tool of FIG. 8; and FIGS. 10–13, schematic sectional plan views corresponding to FIG. 8 of the turret-type machine tool of FIG. 8, in various expansion versions with differing numbers of machining units.

DETAILED DESCRIPTION

Figure 1:
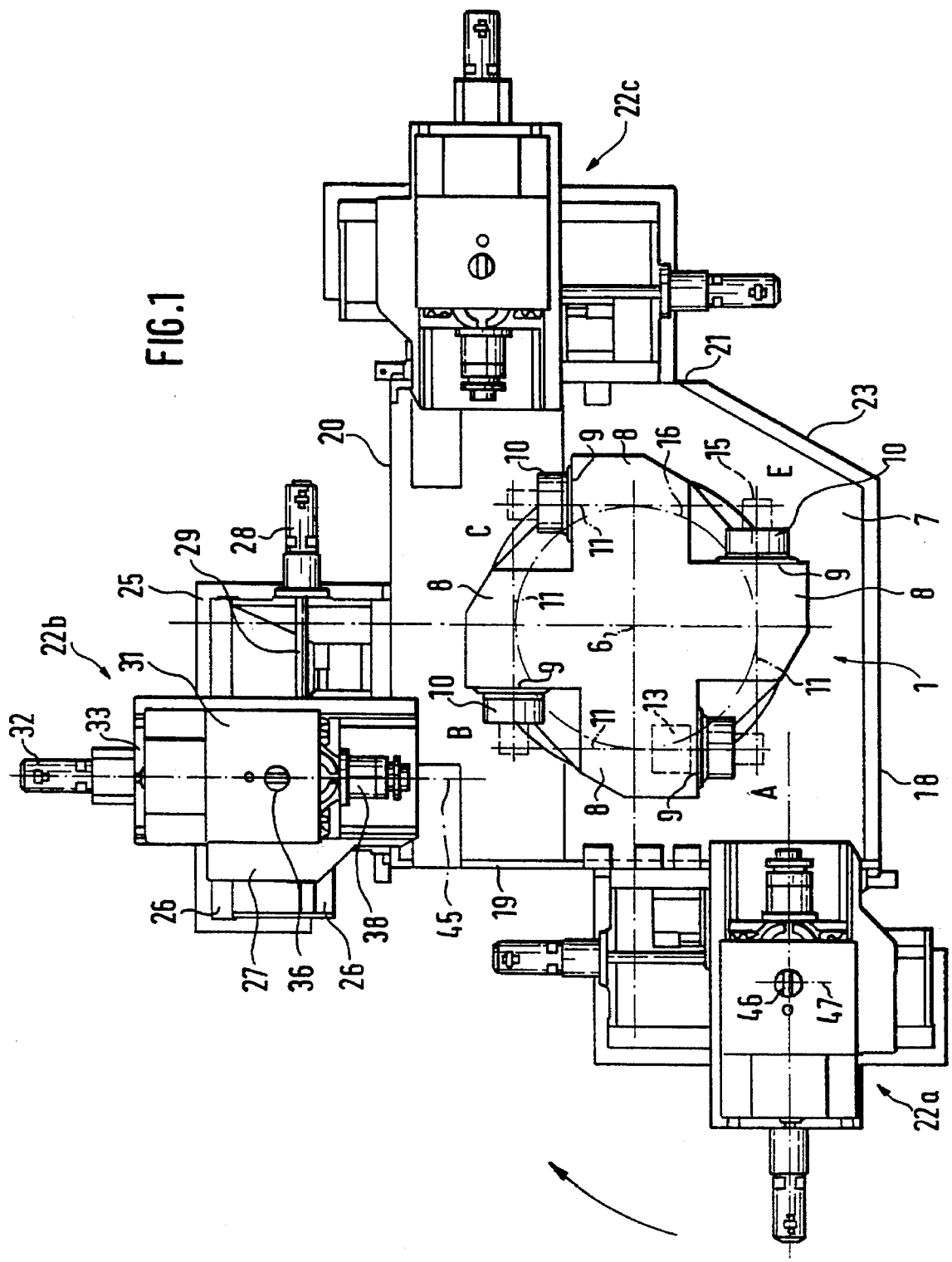
Figure 2:
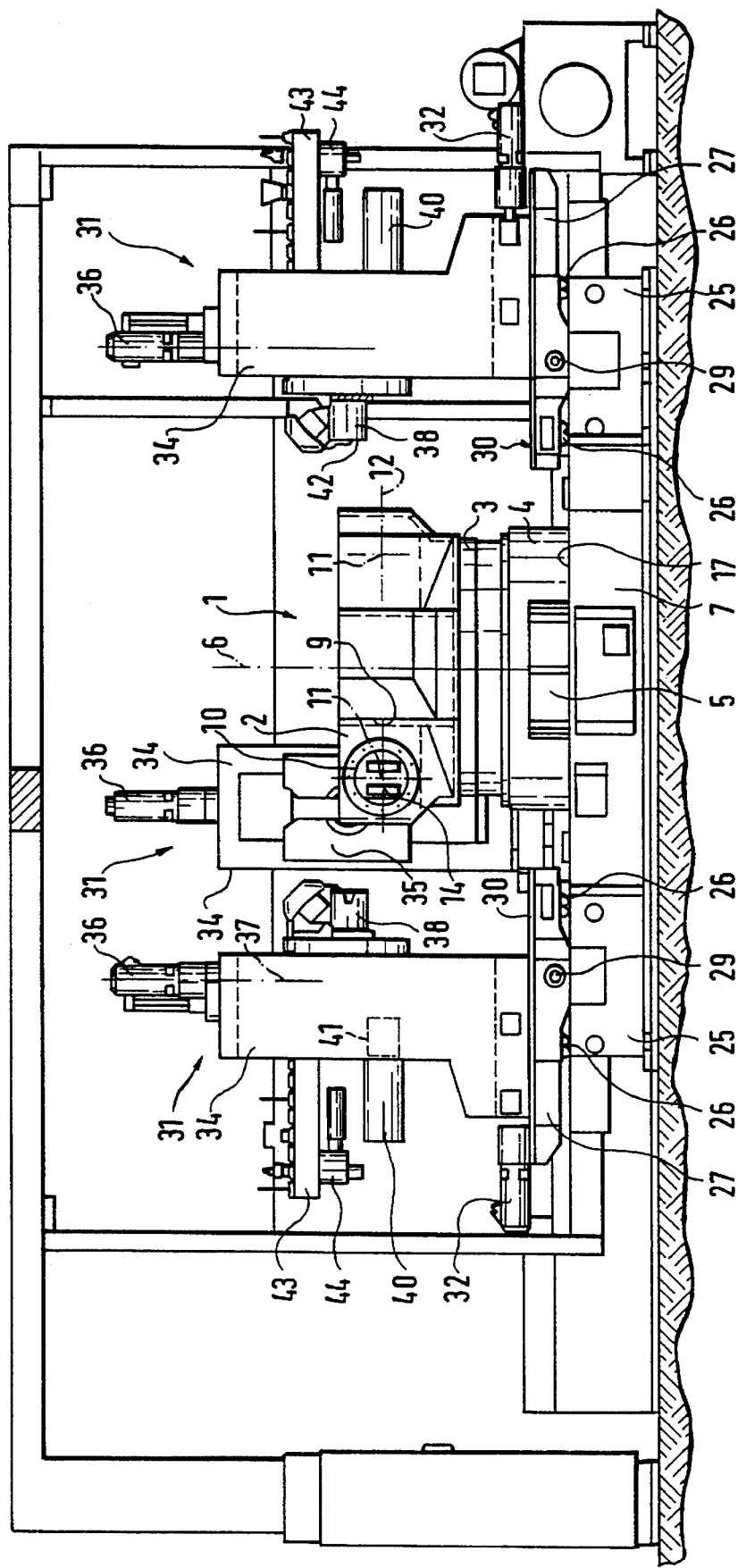

The turret-type machine tool shown in FIGS. 1, 2 has a workpiece support 1, which is formed with a four-armed cross-shaped flat carrier, or support carrier bracket 2, that is located on a circular indexing table 3 that can be indexed in increments onward by a step-drive indicated at 5 and accommodated in a housing 4. The housing or undercarriage 4 of the circular indexing table 3 is secured to a stationary base 7, in such a way that the workpiece support 1 is rotatably supported about its vertical switching axis 6 via the circular indexing table 3.

A workpiece holder or receptor 10 which is rotatably supported about its own axis, the planet axis 11, is located on each of the four arms 8 (FIG. 1), each extending at right angles to one another, of the carrier bracket 2 of the workpiece support 1, in the region of a vertical flat side face 9 (FIG. 1). The four planet axes 11 are located in the same horizontal plane 12 (FIG. 2); they are each aligned in pairs parallel to one another in such a way that the mutually parallel planet axes 11 of each pair are located in either side of the vertical switching axis 6. Each of the workpiece holders 10 has its own planet switching device located in the housinglike bracket 2; of these devices, only one is schematically indicated in FIG. 1, at reference numeral 13. The planet switching devices 13 make it possible to rotate the workpiece holders 10 in a program-controlled manner by 360° about their respective planet axis 11; depending on the intended purpose, this rotary motion may be effected continuously or incrementally, in predetermined angular increments. The planet indexing devices 13 are synchronized with the step-drive 5 for the workpiece support 1, so that the rotary motion of the workpiece holders 10 about their planet axis 11 is necessarily adapted to the indexing motion of the workpiece support 1 about the vertical switching axis 6.

The workpiece holders 10 have suitable chucking devices 14 (FIG. 2) for the particular workpiece; as a rule, these devices are automatically controlled and make it possible for one workpiece each, indicated at reference numeral 15 (FIG. 1), to be chucked positionally correctly.

The step-drive 5 is designed such that it indexes the workpiece support 1 onward by 90° at a time in each indexing motion and locks the workpiece 1 to be stationary in the particular angular position during machining of the workpieces 15.

Since the workpiece holders 10 are located pointing outward to the diametrically opposed pairs of parallel vertical side faces 9 of the arms 8 of the cross-like workpiece support 1, their planet axes 11 each extend at a tangent to a common imaginary circle 16 about the vertical axis 6, a circle which is shown in dashed lines in FIG. 1.

The essentially block-shaped base 7 that receives the workpiece support 1 is approximately square in outline. On its top at 17 (FIG. 2), it is substantially flat and is formed as a welded or cast structure, which for the sake of high stability and freedom from distortion is strongly ribbed in its interior or at least intermittently formed as two shells. Machining units 22 that define three machining stations A, B, C are joined to the four paired side faces 18, 19, 20, 21 (FIG. 1), aligned parallel to one another, of the base 7; in the embodiment of FIG. 1, the machining stations are occupied by machining units 22a, 22b, 22c. A loading and unloading station marked E is provided in the region of a bevel 23 on the side of the base 7.

Each machining unit 22 has its own substantially block-shaped base part 25, which has a horizontal guideway 26 on which a carriage 27 is longitudinally displaceably supported. The carriage 27 is coupled with a feed device 28, which transmits the adjusting motion to the carriage 27 via a drive spindle 29.

A second guideway 30, aligned at right angles to the first guideway 26, is located on the carriage 27; a housinglike double pedestal 31 is displaceably guided on this guideway and is coupled to a control drive 32 that imparts it the applicable control or operating motion via a control spindle 33 (FIG. 1).

Between the two pedestal columns 34 (FIG. 2) of the double pedestal 31, which are rigidly joined together, a headstock 35 is guided vertically displaceably; its associated control drive is marked 36 and is connected to the headstock 35 via a control spindle indicated at 37. An exactly horizontally aligned, precisely supported machining spindle 38 is rotatably supported in the headstock 35, and its associated drive is indicated at 40, 41.

The machining spindle 38 has a tool chucking holder or receptor 42, with which a tool changer located between the two pedestal columns 34 is associated; the tool changer is formed as a beam-type tool changer, and its chain magazine is indicated at 43. The drive of the chain magazine 43 is marked 44. The tool magazine is provided behind the double pedestal 31, so that the machining space in front of the double pedestal 31 is not hindered by the tool magazine.

As can be seen from FIG. 1, for instance, three such identically constructed machining units 22a, 22b, 22c are flanged by their base parts 25 to, the side faces 19, 20, 21 of the workpiece support 1. Because of the special embodiment of the base parts 25 and of the rectilinear guides 26, 30, the axes 45 of the machining spindles 38 of machining units 22 located next to one another extend precisely at right angles to one another. In addition, the operation positions of the workpiece support 1 in which the support is fixed, exactly positionally correctly, against the base 7 during the machining of the workpieces 15, are adjusted such that in each machining station A, B, C the machining spindle axis 45 of the associated machining element 22 is oriented precisely at right angles to or parallel to the planet axis 11 of the workpiece holder 10 located in that machining station.

A glance at FIGS. 1 and 2 also shows that the space above the workpiece support 1 is free, and that the workpiece holders 10, with the workpieces 15 clamped on them, are also easily accessible from the side. The flat surface 17 of the base 7, which may also be dish-shaped, simultaneously enables easy removal of the chips produced.

During operation, at each loading and unloading station E, a machined workpiece 15 is exchanged for an unmachined workpiece on the workpiece holder 10 located in that station. In the ensuing 90° indexing motion, the unmachined workpiece is transferred from the workpiece support 1 to the machining station A, in which by means of the tools inserted into the clamping chuck 42 of the machining spindle 38, the workpiece 15 can be machined on all four sides of its circumference, or on an arbitrary number of sides of its workpiece circumference, which may for instance be round. To that end, the planet indexing drive 13 moves the workpiece into the correct position for each machining operation, by rotating it accordingly about the associated planet axis 11 and then fixing it positionally correctly in the position attained.

Turning operations are in principle also possible, in which the workpiece 15 is set into rotation by the workpiece holder 10, which in that case is driven continuously. In addition, the workpiece 15 may also undergo plane machining on its face end, without chucking of the workpiece having to be changed for that purpose.

After conclusion of the machining in this machining station, the workpiece is moved 90° by the workpiece support 1 to reach the second machining station B, in which corresponding machining operations are performed, followed by machining in the next machining station C, whereupon the workpiece, upon the fourth indexing motion of the workpiece support 1, arrives back in the loading and unloading station E.

In the machining operations in the various machining stations A–C, the machining spindles 38 are controlled completely independently of one another; they may execute motions parallel and at right angles to the respective planet axis 11, in the horizontal and vertical planes. In special cases, when especially complicated workpieces are to be machined, it would also be conceivable for the headstock 35 to be rotatable, for instance via the double pedestal 31, about a vertical axis 46 (FIG. 1) or pivotable between the pedestal columns 34 about a horizontal axis 47 (FIG. 1).

While each of the machining stations A, B, C, in the simplest expansion version shown in FIGS. 1, 2, has a single machining unit 22 associated with it, whose first guide way 26, precisely parallel to the planet axis of the workpiece holder 10 located in that machining station, has a length merely such as to allow the machining spindle 38 to cover the dimensions of the corresponding workpiece 15, the turret-type machine tool can be expanded in modular fashion, without major effort and expense and without changing the basic design, for the sake of the various intended uses.

Various embodiments of such expanded construction options are illustrated in FIGS. 3–7.

These figures are intended merely to provide an overview of the flexibility of the possible uses of the novel machine concept, without making any claim to completeness in showing all the possible expansion versions. Identical elements are identified by the same reference numerals in each of these drawing figures; those already described in conjunction with FIGS. 1 and 2 will not be described again.

Figure 3:
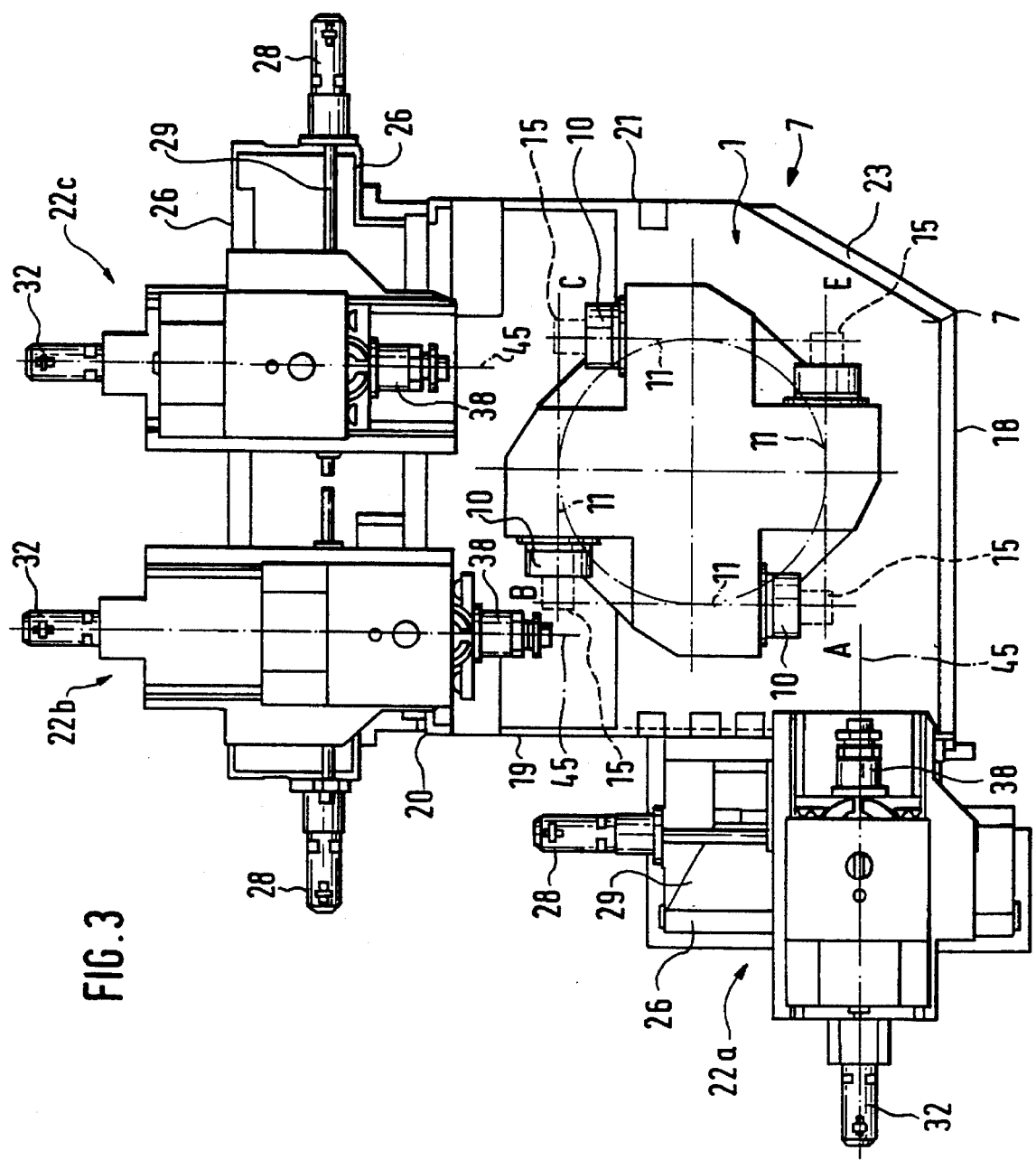

In the embodiment shown in FIG. 3, three machining units 22 are flanged to the side walls 19, 20 of the base 7 receiving the workpiece support 1, and these units define three machining stations A, B, C. While the machining unit 22a in machining station A is formed and located similar to the situation of FIG. 1, the two machining units 22b, 22c, located next to one another, are flanged jointly by their base parts 25 to the side wall 20 of the base 7, so that their machining spindles 38 are axially parallel. The two guide ways 26 may be jointly continuous for the two machining units 22b, 22c, or may be separate for each machining unit.

While the two machining units 22a, 22b are aligned with the axes 45 of each of their machining spindles 38 at right angles to the planet axis of the workpiece holders 10 located in these machining stations A, B, the axis 45 of the machining spindle of the machining unit 22c in machining station C is oriented parallel to the planet axis of the associated workpiece holder 10.

Such an arrangement may be practical if it is important in machining station C to perform machining operations on the workpiece 15 in particular from its face end. Machining on the circumference of the workpiece 15 is predominately done in the preceding machining stations A, B. An additional machining unit on the side 21 of the base 7 is not necessary in this case, in view of the specially machined workpiece 15.

Figure 4:
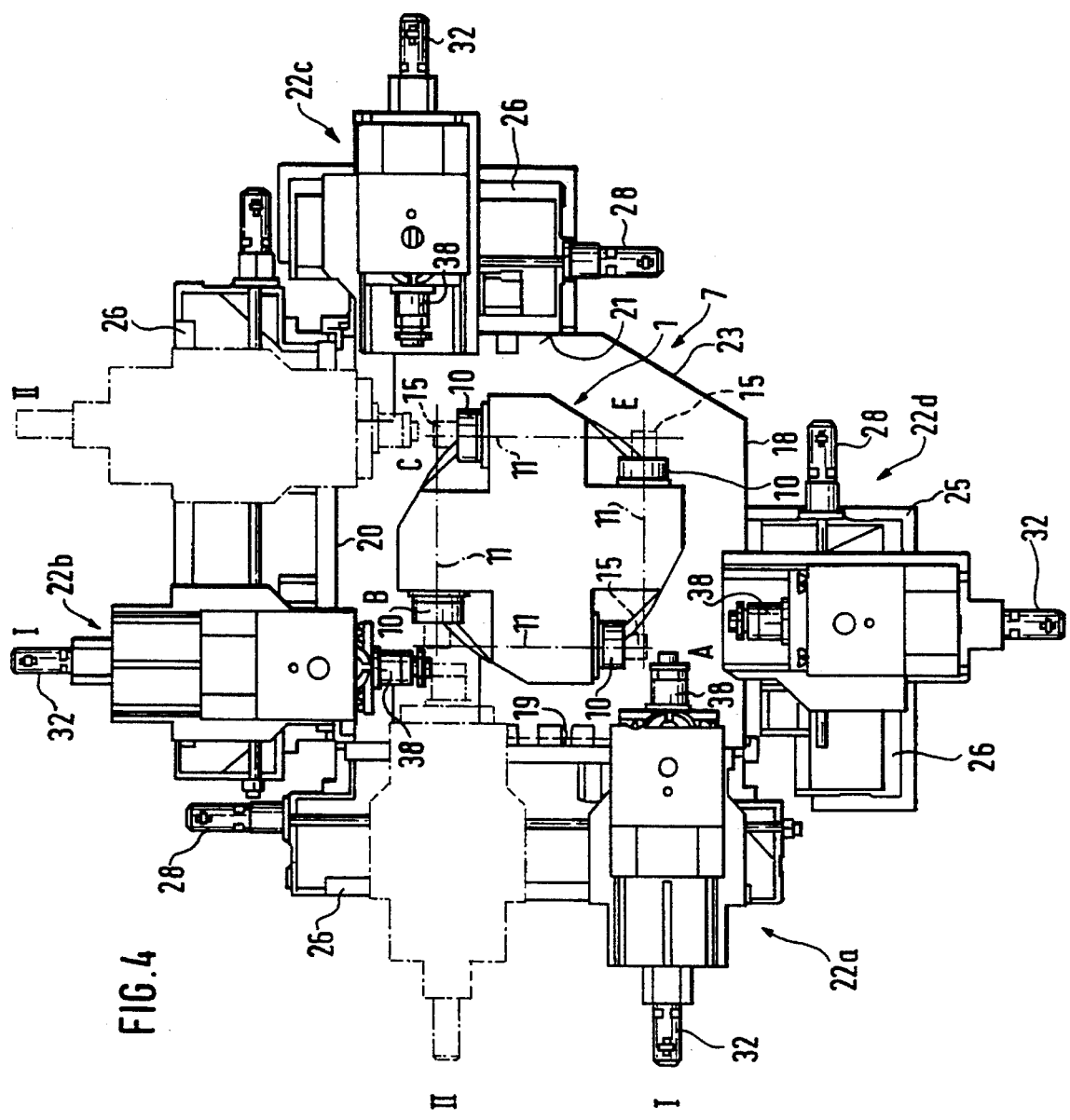

The expansion version of FIG. 4 is equivalent to a turret-type machine tool of the kind shown in principle in FIG. 1, but with the difference that in addition a further machining unit 22d is flanged by its base part 25 to the side wall 18 of the joint base 7.

Moreover, the machining units 22a, 22b joined to the side walls 19, 20 are embodied with a first guideway 26 that is twice as long; its length is such that this horizontal guideway covers two workpiece holders 10 at a time on the workpiece support 1, these holders succeeding one another in the circumferential direction, so that the machining unit 22a or 22b can with its machining spindle 38 selectively cooperate with the workpiece 15 on one or the other of the two workpiece holders 10.

In FIG. 4, these two possible work positions I and II of the machining spindle 38 of the two machining units 22a, 22b are illustrated by showing one of each of these pairs of work positions (II) in dot-dashed lines.

As a glance at FIGS. 4 shows, the workpiece 15 can be machined both on the circumference and from the face end, in other words with a machining spindle 38 whose axis 45 extends at right angles or parallel to the respective planet axis 11, without changing the chucking and without being swiveled upward or downward, in each of the four possible positions of the workpiece support 1 in the machining stations A, B and C. Thus genuine five-sided machining of the workpiece is possible in a single station. Since each of the machining units 22a–22d is independent and can be controlled individually, a very high degree of flexibility in possible uses can be attained in this way.

Figure 5:
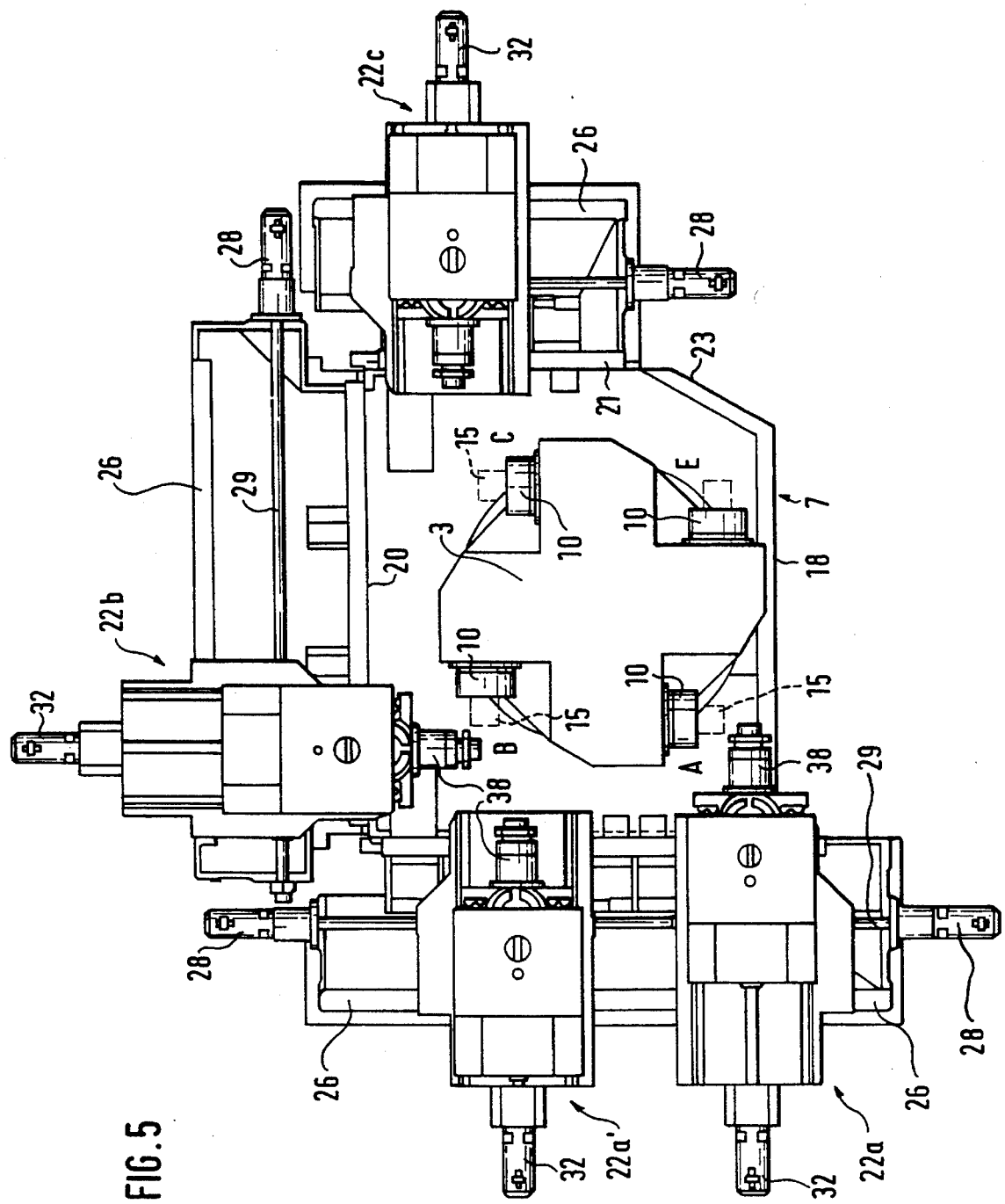

The expansion version shown in the embodiment of FIG. 5 differs from that of FIG. 4 only in that no machining unit 22 is positioned against the side wall 18, adjacent the loading and unloading station E, of the common base 6, while on the "long" continuous first guideway 26 of machining station A there are two machining stations 22a, 22a', each of which has its own control drive 28 that enables adjustment of the two machining units independently of one another.

The workpiece 15 located in the machining station B can thus be machined simultaneously by the machining units 22a' and 22b (five-sided machining). The machining unit 22b can then be transferred to machining station C, where along with the machining unit 22c it machines the workpiece likewise on the circumference and from the face end.

Figure 6:
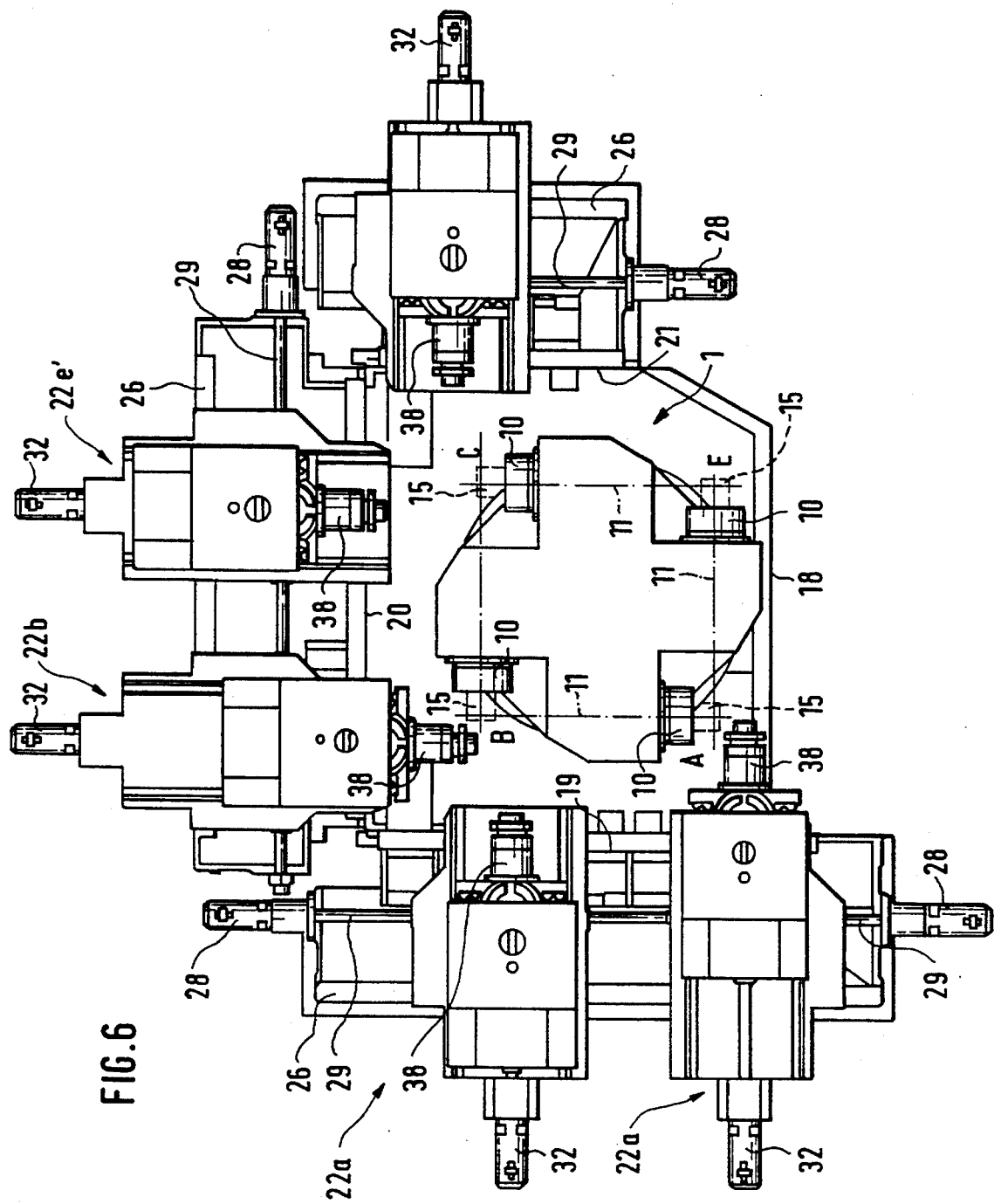

The expansion version shown in FIG. 5 of the novel turret-type machine tool is expanded in FIG. 6 in such a way that on the first, "long" guideway 26, a second machining unit 22b' is used along with the machining unit 22b, and this second unit makes it possible to machine the workpiece from the face end in machining station C as well, simultaneously with the circumferential machining done by the machining unit 22c. As a result, for machining the face end of the workpiece in machining station C, it is unnecessary to wait until the machining unit 22b has complete its work cycle on the workpiece 15 in machining station B and is then available for transfer to machining station C.

Figure 7:
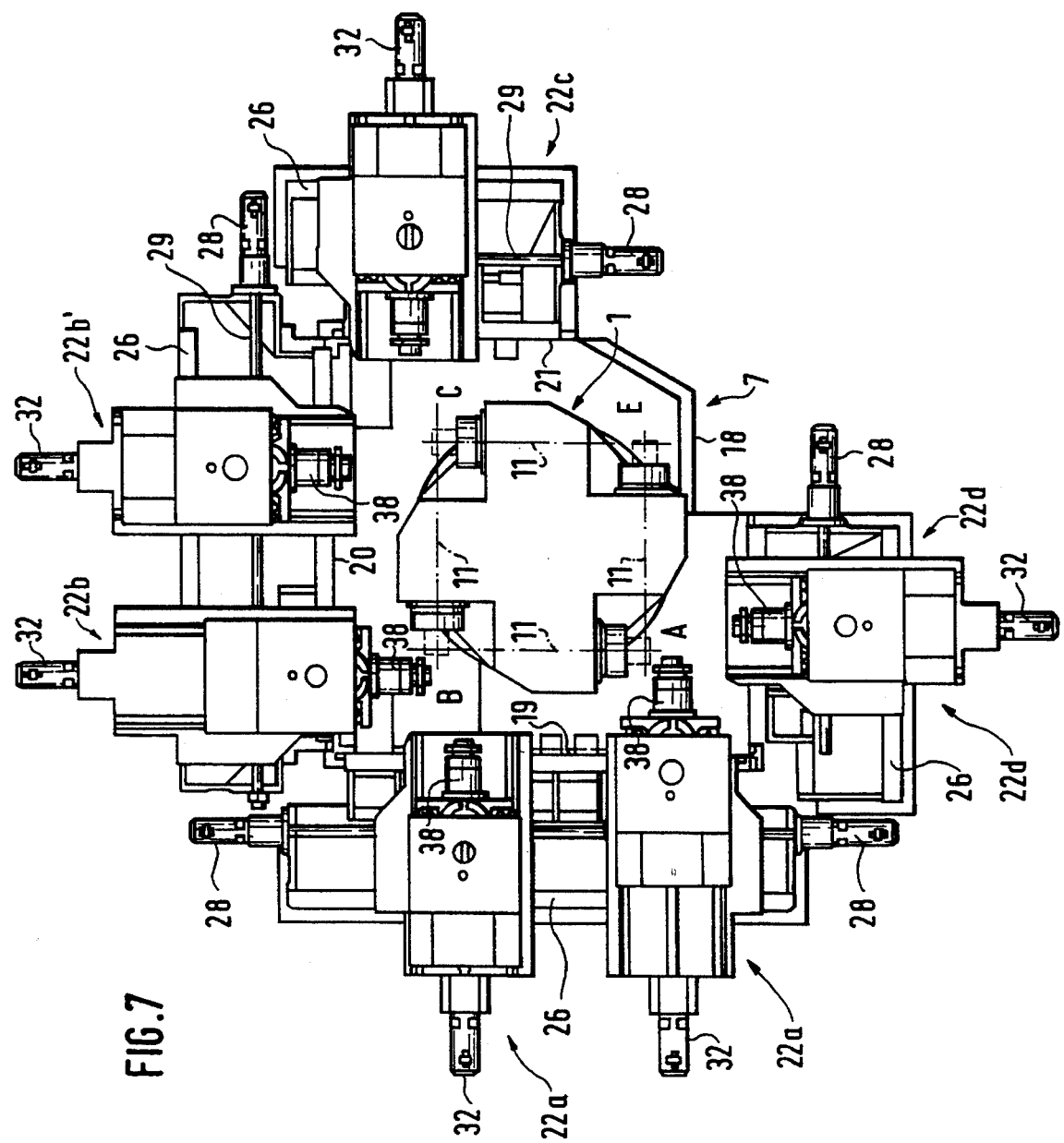

FIG. 7, finally, shows the novel turret-type machine tool in the highest expansion version with six machining units 22, which are flanged to all for side walls 18, 19, 20, 21 of the base 7. The machining units 22a, a' and 22b, b' are each located on a "long" first horizontal guideway 26, while the remaining two machining units 22c and 22d have "short" first horizontal guideways 26, which limit the horizontal operating range of the machining spindle 38 to the available space determined by the dimensions of the workpiece 15. In this connection it should be noted that for special cases, depending on the design of the workpiece, it would also be possible in principle to equip the machining units 22c and/or 22d with a long first guideway 26. This would afford the capability of machining the workpiece 15 even in the loading and unloading station E, following the loading and unloading process. The limitation that would then be involved in such a version of the space available in the loading and unloading station E for the actual loading and unloading operations may possibly be acceptable into the bargain, especially if automatic loading and unloading devices are used that require little space to operate and do not require any clearance distances from human operators for safety purposes at that point.

In FIGS. 8–13, the novel turret-type machine tool is shown in various expansion versions in an embodiment of the kind that may be considered particularly for machining relatively small workpieces. Elements identical to those in the embodiment already described, shown in FIGS. 1–7, are provided with the same reference numerals, except to distinguish them the digit "0" is added. A description of the structure and functions of these elements again will be dispensed with—where possible.

While in the embodiment of FIGS. 1–7 the workpiece support 1 is located on the base 7, to whose side walls 18, 19, 20, 21 the machining units 22, formed as independent modules, are flanged laterally in accordance with the particular expansion version, in the embodiment of FIGS. 8–13 a unitary housing 70 is provided, in whose interior the workpiece support 010 is suspended, while the machining units 220, likewise formed as modules, are inserted, distributed all the way around the workpiece support 010, inserted into corresponding side walls of the housing 70 in the various machining stations A, B, C. The basic function of the turret-type machine tools is the same in both embodiments.

The housing 70, of polygonal cross section (FIG. 8), is formed in the manner of a cage with four flat side wall parts 180, 190, 200, 210, which are parallel in pairs with one another and between which setting-up openings 181, 191, 201 are provided, resulting in a polygon that is essentially closed all the way around in the loading and unloading station El, except for the setting-up openings and a service opening 211. A substantially flat upper wall 170 is mounted on the side wall parts 180, 190, 200 and 210, while the aforementioned side wall parts are seated below on a bottom wall 171 with which they are rigidly joined. The bottom wall 171 has a central circular chip removal opening 172, which is defined all the way around by a chip removal funnel 173, which may form part of the bottom wall construction and contributes to rigidifying the entire apparatus.

Figure 9:
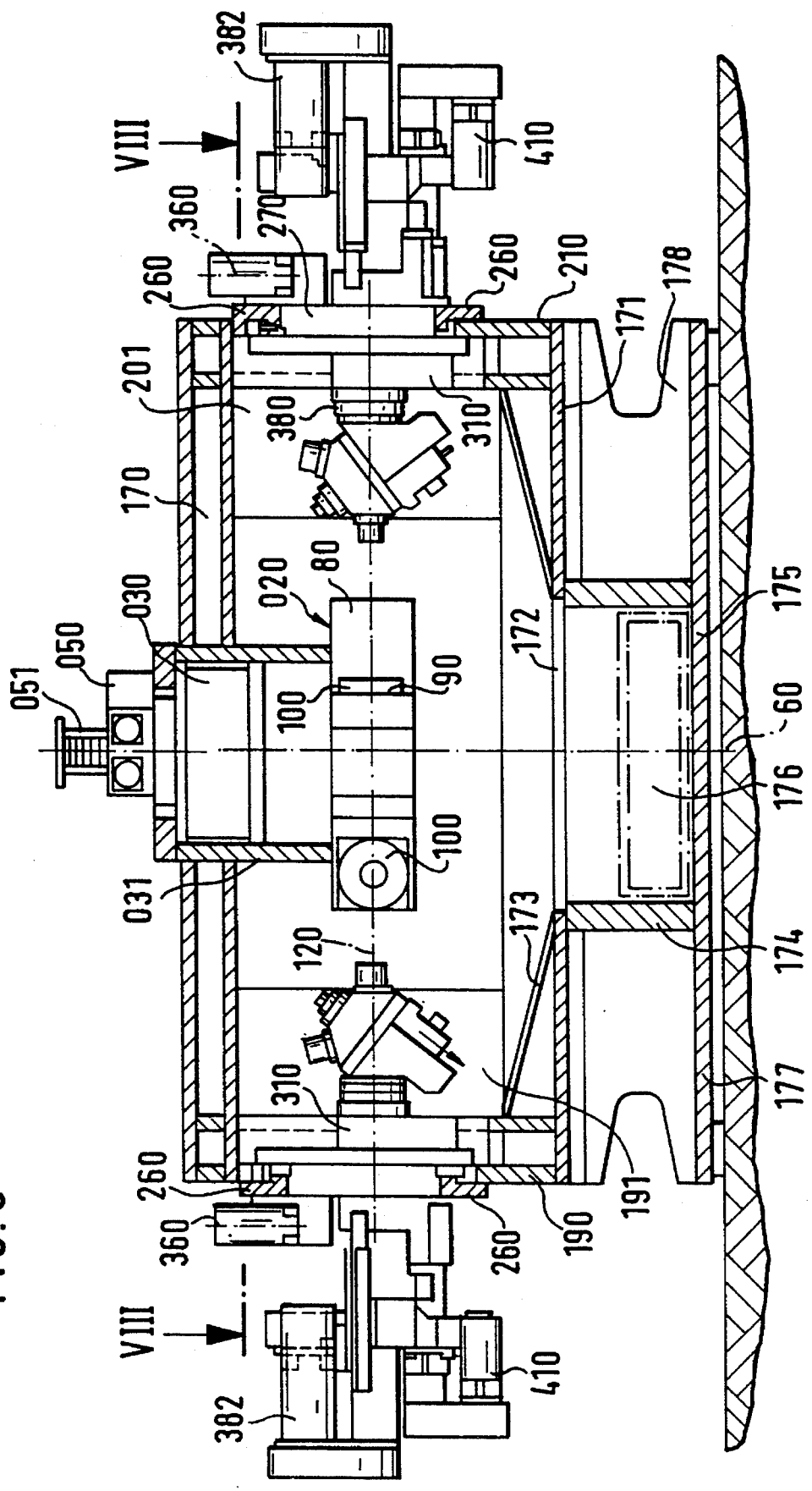

The side wall parts 180, 190, 200 and 210 along with the upper wall 170 and the bottom wall 171 are strongly ribbed and/or formed in two shells, as shown in FIG. 9, and are parts of a unitary welded construction that forms the cagelike housing 70. The cagelike housing 70 is distinguished by great rigidity and distortion stability. It is dimensioned such that the forces of reaction that arise in the various machining stations A, B, C when the workpieces are machined are absorbed in the housing 70 itself, so that a machine pedestal or other structural elements provided on the floor for supporting the housing 70 need not absorb any force. In the exemplary embodiment shown, a hollow center column 174 serves to set up the housing 70 at the required operating height; it is coaxial with the vertical center axis forming the switching axis 60, and its interior communicates with the chip removal opening 172. Chip removal takes place laterally by means of a chip conveyor 176 (FIG. 9), through a suitable lateral opening 175 below the bottom wall 171.

Between the center column 174, the bottom plate 171 and a foot plate 177, narrow ribs 178 arranged in a star pattern assure tilt-proof connection of the housing 70 with the center column 174.

Instead of the center column 174, set up feet or suitable support elements located on the periphery of the bottom wall 171 could also be used; it would even be possible to suspend the housing 70 from a suitable support construction and thus keep the space under the bottom wall 171 entirely free.

The workpiece holder 010 has a four-armed, cross-shaped carrier or support bracket 020, which is identical in construction to the carrier or support bracket 2 of FIGS. 1 and 2, and which on the side faces 90, which are parallel to one another in pairs, of its arms 80 carries the workpiece holders 100, formed in the manner of planet carrier tables.

Figure 8:
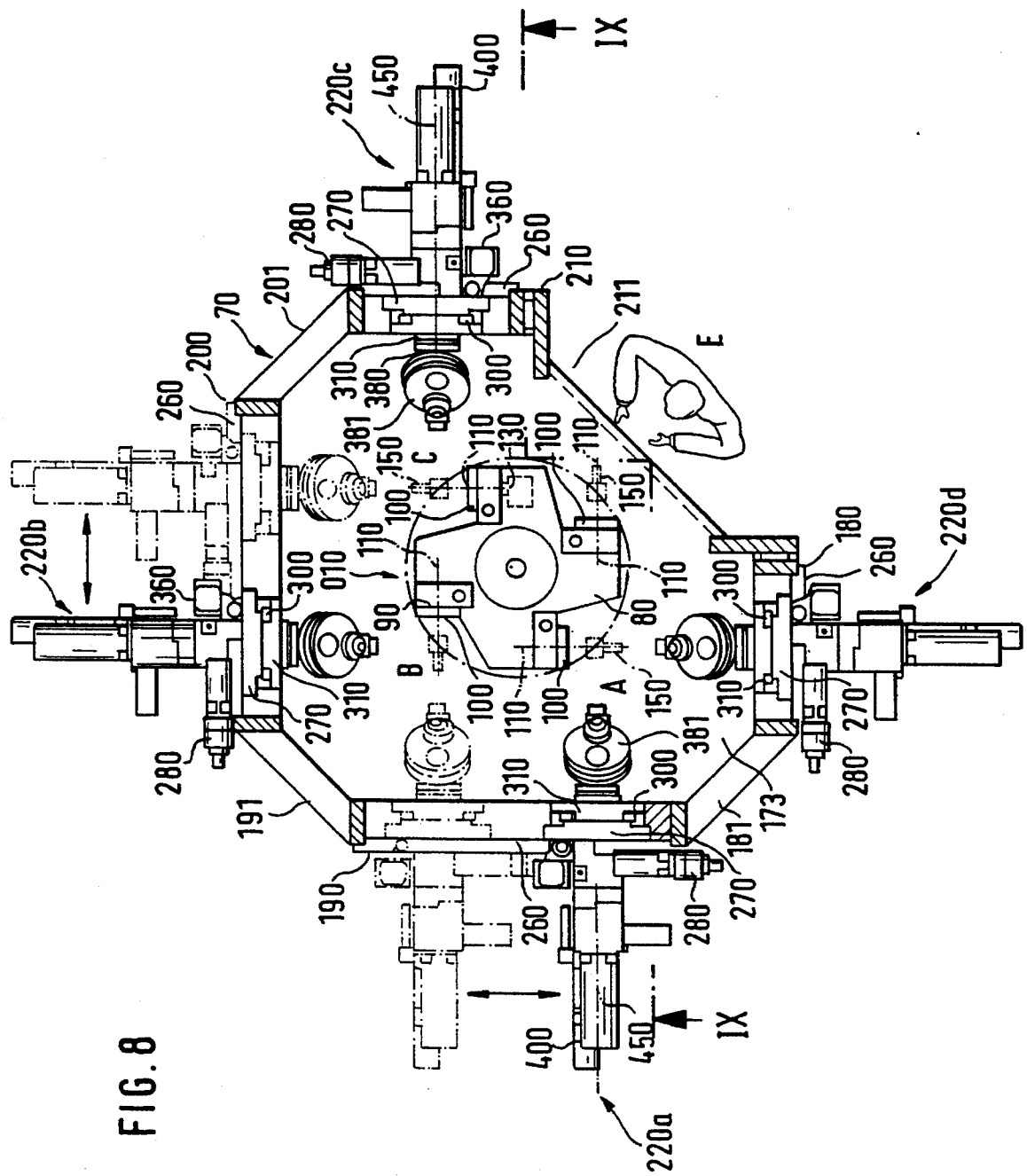

The planet axes 110 of the workpiece holders 100 again extend at a tangent to and radially spaced apart from the vertical switching axis 60; they are aligned in pairs parallel to one another and are located in a common horizontal plane 120 (FIG. 9). One drive 30 is assigned to each workpiece holder 100, as indicated in FIG. 8 for a workpiece holder 100. The drives 130 make it possible in a programmed manner to rotate each workpiece holder 100 separately by itself, either continuously or in predetermined increments, around the associated planet axis 110.

The bracket 020 is suspended from an indexing table 030, which is located in a cylindrical housing 031 that is joined to the upper wall 170 and at the same time takes on the task of radially guiding the bracket 020. The associated indexing drive mounted on it is shown at 050. An associated incremental angle encoder for the angular position of bracket 020 is indicated at 051.

First horizontal guideways 260 are formed in the flat lateral wall parts 180, 190, 200, 210 that are located in pairs facing and parallel to one another on either side of the vertical switching axis 60; these guideways define corresponding openings in the wall parts at the top and bottom. A carriage 270 is supported horizontally displaceably on each of the horizontal guideways 260, and this carriage has vertical guideways 300 on which a transverse carriage 310 is guided so as to be vertically adjustable. The modular-construction machining unit 220 is inserted with a horizontal spindle axis 450 into a corresponding through opening in the transverse carriage 310.

Each revolver unit 220 has a machining spindle 380, supported in a tailstock Sleeve and carrying a tool turret 310, mounted on the tailstock sleeve; in the exemplary embodiment shown, this turret is formed as a star turret with a switching axis of the turret that extends at an angle of 45° relative to the spindle axis 450.

The control drive for axially advancing the tailstock sleeve and the turret 381 is marked 410. The spindle drive is effected via a drive unit 382. The control devices for the horizontal adjustment of the carriage 270 and the vertical adjustment of the transverse carriage 310 are indicated at 280 and 360.

Similarly to the embodiment of FIGS. 1–7, five-sided machining of the workpiece 150 is possible in each of the machining stations A, B, C, without requiring rechucking of the workpiece. The spindle axis 450 of the machining unit 220 located in the respective machining station extends at right angles or parallel to the planet axis 110 of the workpiece holder 100 located in that machining station. The workpiece support 010 is rotatable by its step-drive once again by 90° at a time about the switching axis 60, and it can be fixed to be stationary in its angular position once attained.

In the embodiment shown in FIG. 8, a expansion version is illustrated in which one machining unit 220a, 220b, 220c is inserted into the respective side wall parts 180, 190, 200 and 210. The horizontal guideways 260 of the machining units 220a, 220b are embodied as long enough that the machining unit can be selectively displaced back and forth between two workpiece holders 100 adjacent one another On the circumference of the workpiece support 010, as is indicated in FIG. 8 by arrows and by an outline in dashed lines of the machining unit. These machining units 220a, 220b can therefore machine the workpieces 150, located in the machining stations A, B and C, on five sides, together with the other machining units 220d, 220c associated to these machining stations. The horizontal first guideways 260 of the other machining units 220c, 220d are chosen to be "short; that is, their length suffices to move the machining spindle 380 with the turret 381 over the dimensions of the workpiece 150 clamped on the workpiece holder 100 located in the applicable machining station.

The tools clamped in the turret 381 can be moved vertically as well in each machining station via the transverse carriage 310, and via the tailstock sleeve drive of the machining spindle 380 that can be positioned to the workpiece and retracted from it again.

Figure 10:
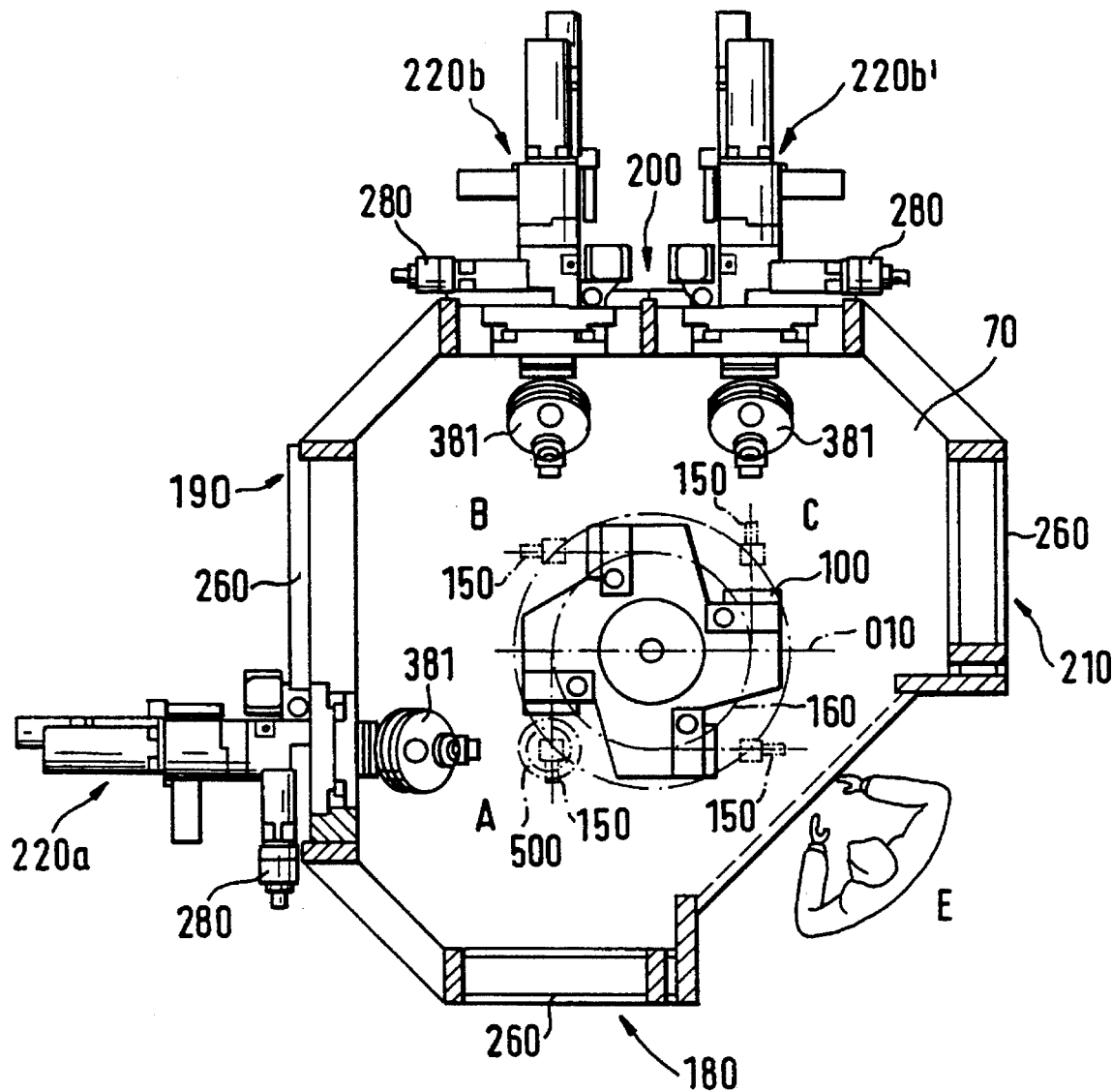

The embodiment of the turret-type machine tool shown in FIG. 10 differs from that of FIGS. 8, 9 in having a simplified expansion version. Only three machining units 220a, 220b and 220b' are provided, of which the machining unit 220a, similarly to FIG. 8, is adjustable horizontally over a long first horizontal guideway 260, far enough that a workpiece 150 can be machined both in the machining station A (on the circumference) and in the machining station B (from the end).

The two machining units 220b, 220b' are each adjustable on a "short" first horizontal guideway 260; they serve to machine the workpieces 150 in the two adjacent machining stations B and C, in the manner that can be seen in FIG. 10.

Figure 11:
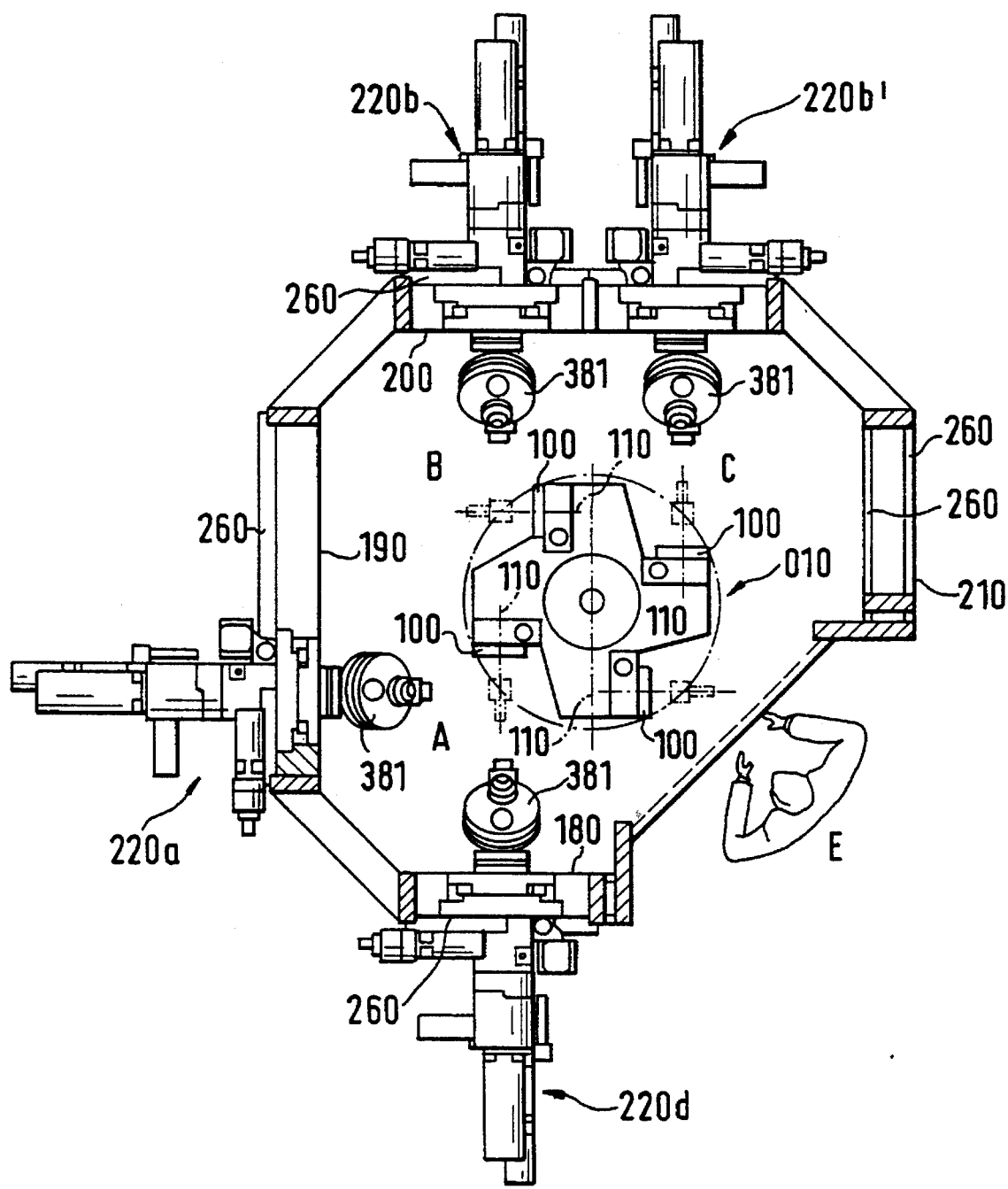

In the expansion version shown in conjunction with the embodiment of FIG. 11, the arrangement of the machining units 220 is chosen to be similar to that of the embodiment of FIG. 10. The only difference is that the machining unit 220d of FIG. 8 is inserted into the wall part 180. Accordingly, the workpieces 150 can be machined both from the end and from the circumference in machining station A—and this is equally applicable to the workpieces 150 in machining station B—while in machining station C, machining of the workpieces 150 is done only from the face end.

Figure 12:
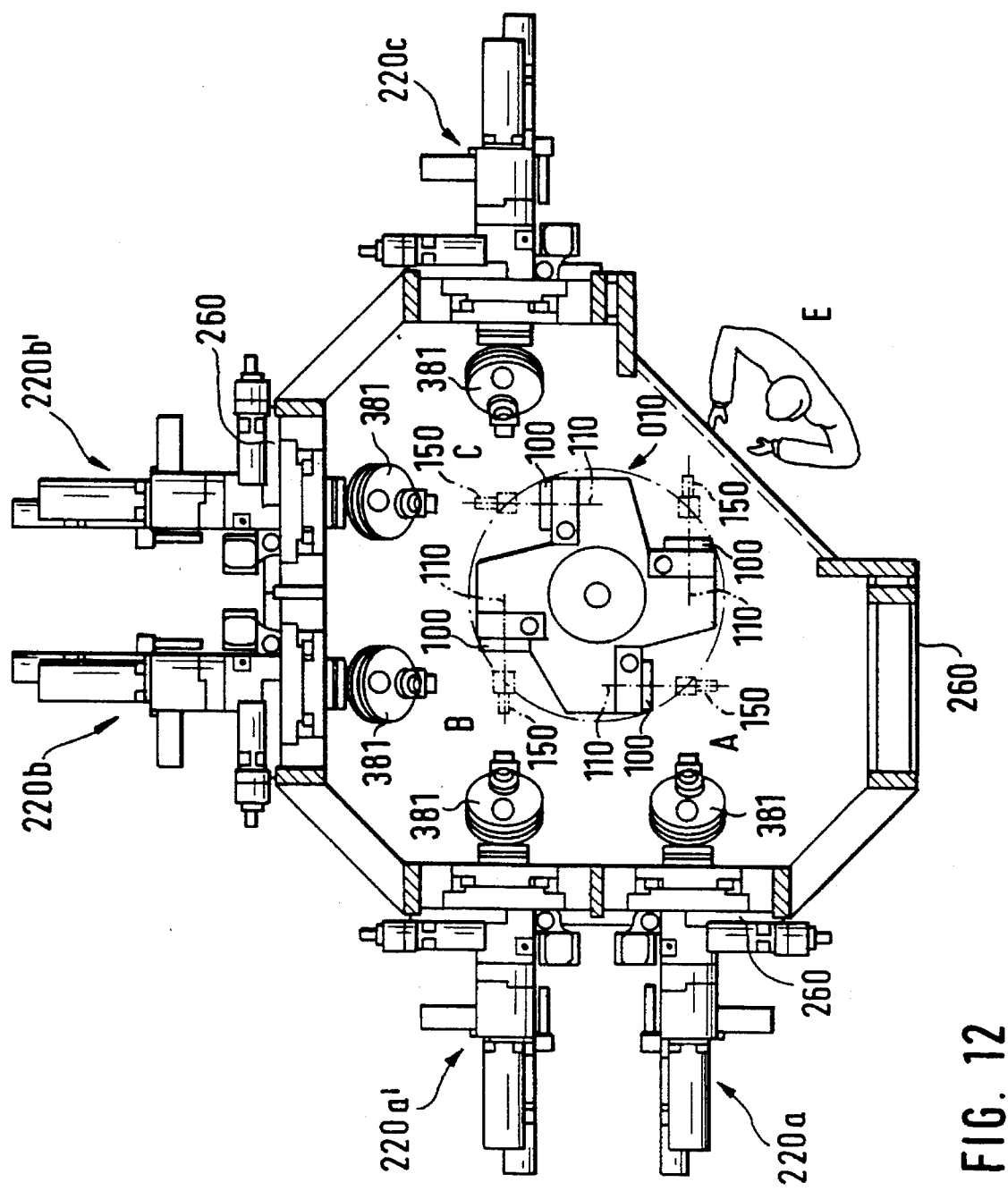

The expansion version shown in conjunction with FIG. 12 is chosen to be such that two machining units 220a, 220a' on the one hand and 220b, 220b' on the other are inserted into each of the side wall parts 190, 200 that have "short" first guideways 260.

The type of workpieces 150 to be machined here is such that in machining station A, machining is done only from the circumference, while in the ensuing machining stations B, C, the workpieces 150 are each machined both from the face end and from the circumference, with separate drive units 220a, 220b; 220b', 220c.

Figure 13:
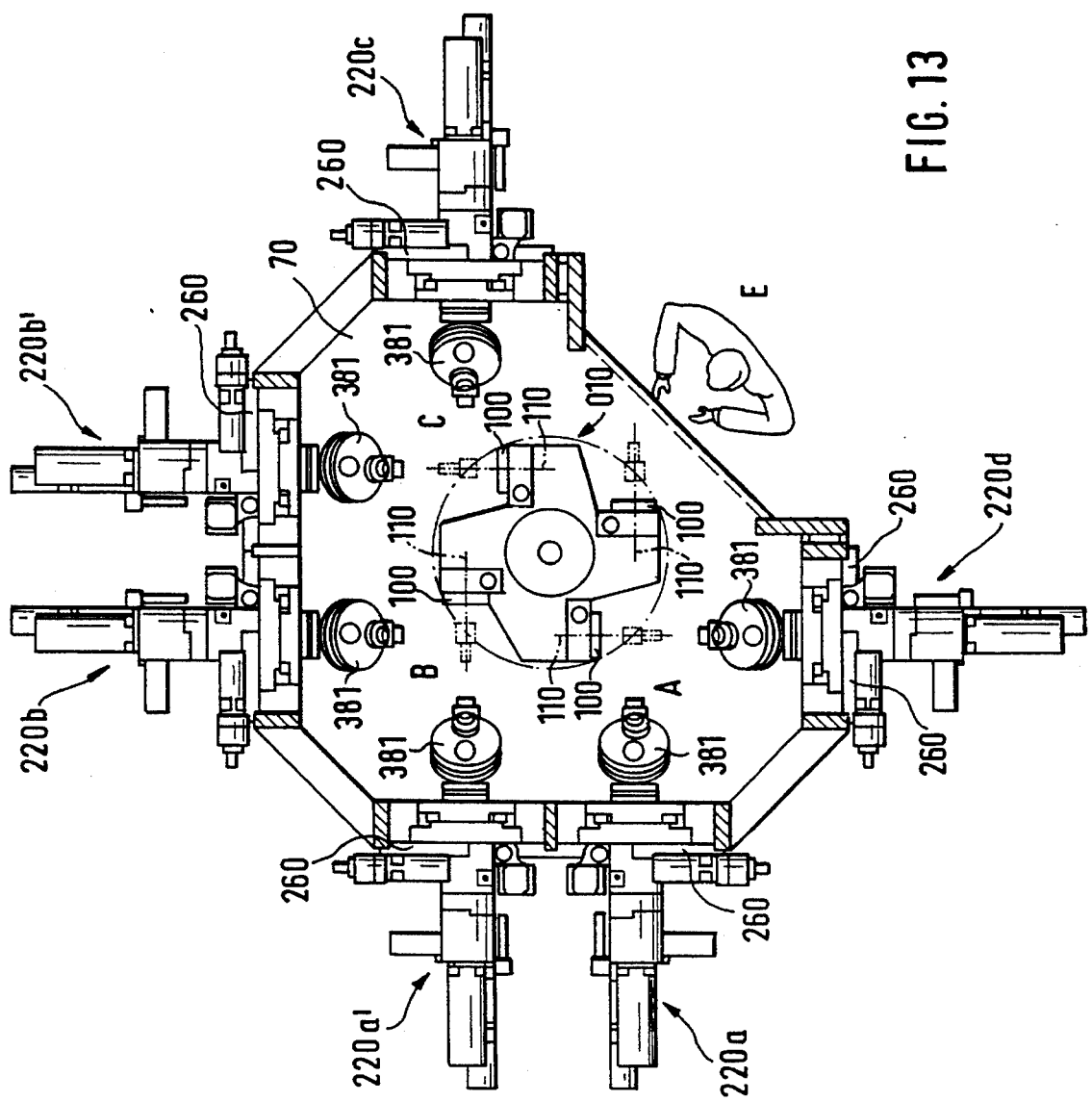

Finally, FIG. 13 shows the most complete expansion version, with six machining units. All the machining units 220a, 220a'; 220b, 220b'; 220c; and 220d are inserted into the respective associated side wall parts, which are equipped with short first guideways 260 that are dimensioned solely with a view to the dimensions of the workpiece 150 to be machined. In this case, machining of the workpieces 150 is possible on the circumference and from the face end by separate drive units in each of the machining stations A, B, C, so that especially short machining times result, and maximum flexibility in terms of usage options is assured.

The structural details of the basic layout of the machining units 220 are described in German Patent 39 41 450. As explained there, if this should be necessary in view of the particular structural type of workpieces 150 to be machined, additional further machining units 220, for all the expansion versions described, may be inserted into the flat horizontal upper wall 170 or into the likewise horizontal lower wall 171 in the various machining stations A, B, C, so as to create still further machining axes. Similarly to the embodiment of FIGS. 1–7, individual machining units may also be supported so as to be pivotable about a horizontal or vertical axis.

In the embodiments described of the novel turret-type machine tool, the assumption was a workpiece support 1 or 010 that is four-armed and that accordingly carried four workpiece holders 10 or 100. In principle it would also be possible to construct the turret-type machine tool with a different number of machining stations and to use a workpiece support that has not four but rather more or fewer (for instance 2 or 6) workpiece holders 10 or 100. In each case, however, the planet axes 11 or 110 of the workpiece holders are aligned at a radial distance from and at a tangent to the vertical switching axis 6 or 60 and are located lying in at least one horizontal plane. The machining units 22, 220 are as a rule genuine three-axis units.

The invention accordingly involves a two-, four- or six-station circular table machine with indexing increments of 180°, 90° or 60°, respectively and with two or four or six workpiece supports 1, 010 with a horizontal pivot axis in a tangential arrangement relative to the indexing or switching circle, in each case with equal spacing from the indexing or switching center, but offset axially outward by a certain amount; paired diametrically opposed workpiece support axes extend parallel to one another. As a result, the workpieces to be machined shift as far outward as possible, enabling relatively short tools and short machining distances.

The number of machining units 22, 220 may be varied widely within the same structural principle and using the same workpiece support 1, 010. For instance, 2, 3, 4, 5 or 6 machining units may be provided, one or more of which are located on "short" guideways 26, 260 that cover the workpiece 15, 150 in a machining station, while other machining units are supported on "long" guideways 26, 260 that permit displacement of the machining unit between two machining stations A, B, C. Finally, at least one guideway on which two machining units are seated next to one another, as noted, may also be combined with each of these options. The machining spindle 38, 380 of each machining unit 22, 220 is independent of the machining spindles 38, 380 of the other units. Accordingly, all the machining spindles 38, 380 may be dimensionally corrected independently of one another, and the chronological succession of operations done for the various workpieces may be designed to achieve short machining times.

Particularly whenever the turret-type machine tool is to be used to machine relatively large workpieces 15, 150, it is suitable for the machining units 22, 220 to be located as modules on their own base parts that are rigidly connected to a base 7 that supports the workpiece support 1, 010. In this way, the machine can be constructed in modular fashion, in that the type and number of modules required for a given instance is flanged to the base 7 that supports the workpiece support 1, 010. Each of these modules is independent; it has its own feed, control and drive units and as a rule is equipped with only a single machining spindle. For smaller workpieces, a version of the turret-type machine tool is possible in which the workpiece support 1, 010 is suspended in a rigid, stable and distortion-resistant housing 70 formed like a cage, similarly to what is described in German Patent 2 755 755 and which has lateral wall parts into which the machining units are inserted. Advantageously, this cage is polygonal in cross section, and at least one of the aforementioned horizontal guideways is located in the region of a flat side wall.

Particularly in this embodiment, depending on the needs of an individual instance, it is also possible for at least one machining unit, working from above or from below with a vertically aligned machining spindle to be located in at least one machining station. In all the expansions it is also possible for at least one of the machining units to be supported adjustably and/or pivotably in the vertical direction as well. Finally, the area of application can also be expanded in a simple way by providing at least one machining station with a workpiece turret assigned to the machining spindle; this makes it possible to put a plurality of tools in succession in engagement with the workpiece.

As a rule, the expansion turret-type machine tool should be provided with a separate loading station that makes it possible while the other workpieces are being machined to load and unload the workpiece holder 10, 00, located in that station, for the workpiece support 1, 010. Problem-free integration of automated loading and unloading systems can then be done. The machine concept is accordingly distinguished not only by requiring little space but also by low labor costs during operation.

We claim:

1. A turret-type machine tool comprising a workpiece support (1, 010), rotatably supported for rotation about a vertical tool switching axis (6, 60) and indexable incrementally by a step-drive, said workpiece supports (1, 010) being lockable in stationary position in individual machining stations (A, B, C) in accordance with respective angular positions, said workpiece support (1, 010) being formed with at least one pair of side surfaces (9, 90) positioned opposite each other, with respect to said tool switching axis (6, 60), and extending parallel to each other;

at least two workpiece holders or receptors (10, 100) located on the workpiece support (1, 010), said workpiece holders or receptors being formed as circular rotatably supported tables, rotatable about their own axis and each defining a planet axis (11, 10);

switching or drive means (13, 130) coupled to the workpiece holders or receptors (10, 100) for rotating the respective holders or receptors about their own planet axis (11, 110);

machining units (22, 220) assigned to the respective machining stations (A, B, C), said machining units being located laterally of the workpiece support (1, 010), at least one machining unit having at least one machining spindle (38, 380), which spindle can be positioned in the direction of the workpiece support (1, 010), wherein the planet axes (11, 110) of the workpiece holders (10, 100) are
 located in at least one horizontal plane (12, 120),
 two of said planet axes being aligned as a pair parallel to each other,
 are spaced by equal distances from the vertical tool switching axis (6, 60), and
 extend at a tangent to a theoretical circle having the tool switching axis (6, 60) as its center; and wherein the workpiece holders or receptors (10, 100) are located at opposite side surfaces (9, 90) and facing in opposite directions with respect to said pair of side surfaces of the workpiece support (1, 010).

2. The turret-type machine tool of claim 1, characterized in that at least one of the machining units (22; 220) is horizontally adjustably supported on an horizontal guideway (26; 260), which is aligned parallel or at right angles to the planet axes (11; 110) at one of the angular positions of the workpiece support (1, 010).

3. The turret-type machine tool of claim 2, characterized in that the at least one guideway (26; 260) has a length covering two workpiece holders (10; 100) succeeding one another in the circumferential direction on the workpiece support (1; 010), such that the machining unit (22; 220), with its machining spindle (38; 380), is adjustable to cooperate selectively with one or the other of the two workpiece holders.

4. The turret-type machine tool of claim 2, characterized in that on at least one of the guideways (26; 260), two machining units (22; 220) are located side by side, optionally adjustable independently of one another.

5. The turret-type machine tool of claim 1, characterized in that at least one of three machining units (22; 220) is supported so as to be adjustable in the vertical direction.

6. The turret-type machine tool of claim 1, characterized in that at least one of the machining units (22; 220) is supported to be swivelable.

7. The turret-type machine tool of claim 1, characterized in that at least one machining unit (22; 220), working from above or from below with a vertically aligned machining spindle (38; 380) is located in at least one machining station (A, B, C).

8. The turret-type machine tool of claim 1, characterized in that the machining units (22) are located as modules on their own base parts (25), which are rigidly connected to a base (7) that supports the workpiece support (1).

9. The turret-type machine tool of claim 1, characterized in that the workpiece support (010) is located in suspended fashion in a rigid, stable and distortion resistant housing (70) formed in the manner of a cage, which has lateral wall parts (180, 190, 200, 210) into which the machining units (220) are inserted.

10. The turret-type machine tool of claim 9, characterized in that at least one of the machining units (22; 220) is horizontally adjustably supported on an horizontal guideway (26; 260), which is aligned parallel or at right angles to the planet axes (11; 110) at one of the angular positions of the workpiece support (1, 010); and in that the cage is formed with polygonally in cross section and at least one guideway (260) is provided, which is located in the region of a flat side wall (180, 190, 200, 210).

11. The turret-type machine tool of claim 1, characterized in that at least one machining station (A, B, C) has a tool turret (381) associated with the machining spindle (380).

12. The turret-type machine tool of claim 1, wherein the switching or drive means (13) associated with at least one of said workpiece holders or receptors (10, 100) comprises means for continuously rotating the respective workpiece holder or receptor.

13. The turret-type machine tool of claim 1, wherein said diametrically oppositely located side surfaces (9, 90) are essentially parallel to the vertical tool switching axis (6, 60).

\* \* \* \* \*